United States Patent Office 3,573,259
Patented Mar. 30, 1971

3,573,259
PROCESS FOR THE PREPARATION OF ISOCYANURATE-CONTAINING POLYISOCYANATE SALTS
Perry A. Argabright, Brian L. Phillips, and Joe T. Kelly, Littleton, Colo., assignors to Marathon Oil Company, Findlay, Ohio
No Drawing. Filed Mar. 22, 1968, Ser. No. 715,199
Int. Cl. C08g 22/16; C07d 55/00
U.S. Cl. 260—77.5
14 Claims

ABSTRACT OF THE DISCLOSURE

Isocyanurate-containing polyisocyanate metal salts are prepared by reacting metal cyanate with organic diisocyanate in the presence of aprotic solvent at a temperature of from about 0 to 250° C.

Utilities of the products include use in preparing water-soluble uralkyd coatings.

CROSS REFERENCES TO RELATED APPLICATIONS

Co-pending U.S. patent application S.N. 682,576 filed Nov. 13, 1967 and assigned to the assignee of the present invention, relates to the preparation of isocyanuric acid and their corresponding monofunctional metal salts by reacting a metal cyanate and an organic monoisocyanate in the presence of an aprotic solvent.

BACKGROUND OF THE INVENTION

This invention relates in general to the preparation of polyisocyanate salts wherein at least one of the linkages is a metal salt of an isocyanurate functional group. In the past, polyisocyanates have been prepared containing isocyanate trimer functional groups in the molecule, but have not contained metal salts of isocyanurate functional groups. For instance, U.S. Patent No. 3,211,704 to Gilman et al. discloses a method for preparing ether linked isocyanurates.

U.S. 3,280,066 teaches a method for preparing polymers of tolylene diisocyanate containing at least one isocyanurate ring per molecule.

SUMMARY

In general, this invention describes a method for preparing polyisocyanates containing isocyanurate salt groups. These product compounds are pictorially represented below as average compounds A and B for monovalent and polyvalent metal polyisocyanate salts, respectively:

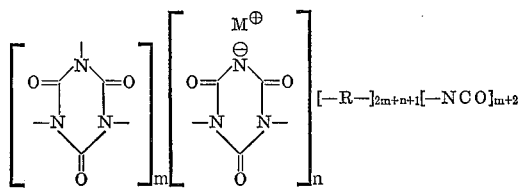
A where $m$ is a positive integer and preferably less than about 100 and may be zero, and $n$ is a positive integer and preferably less than about 100 and greater than zero, and R is alkyl, aryl, or aralkyl as hereinafter more fully described;

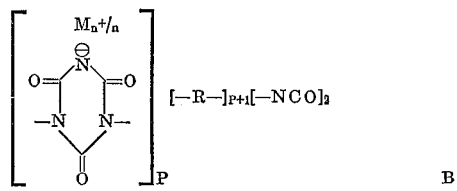
B wherein $n$ equals the oxidation number of the metal and P is a positive integer and R is the same as in compound A above. As an example, when $m$ is zero and $n$ is two and M is monovalent, the polyisocyanate metal salt product will have the following average composition:

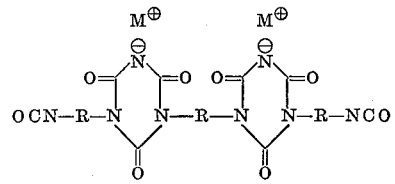

Particularly, these compounds are formed by reacting metal cyanate with organic diisocyanate in the presence of aprotic solvent and at a reaction temperature of from about 0 to about 250° C.

The products of this invention are useful, inter alia, as ion exchange resins, free polymers for the preparation of water soluble uralkyds, and as starting materials for the preparation of novel polyurethanes. Thus, glycerides, prepared from glycerol and linseed oil, may be reacted with reaction product A above, to form a water soluble uralkyd. Also, reaction product A may be reacted with a diol to form a novel polyurethane. The variety of uses of the products of this invention is primarily due to the ease in forming derivatives of the products of this invention by substitution reactions.

DESCRIPTION OF THE PREFERRED EMBODIMENTS (1) Starting materials

The metal cyanates useful for the present invention include alkali metal and alkaline earth metal cyanates. The alkali metal cyanates are more preferred, and sodium cyanate is the most preferred metal cyanate useful for this invention. Examples of metal cyanates having utility herein include: sodium cyanate, lithium cyanate, potassium cyanate, rubidium cyanate, cesium cyanate, calcium cyanate, strontium cyanate, and the like, or compatible mixtures thereof.

Organic diisocyanates having utility for the present invention are characterized by the following structural formula:

OCN—R—NCO 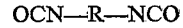

wherein R may be aryl such as

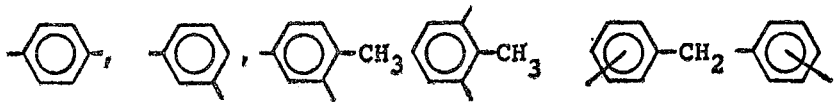

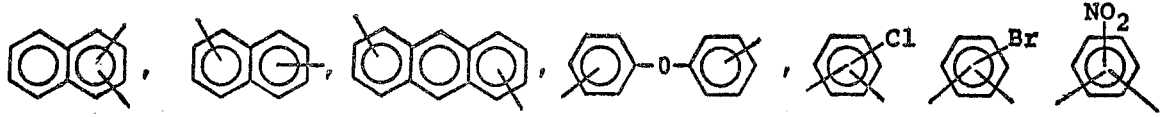

or other non-interfering substituted derivatives or compatible mixtures thereof. R may also be alkyl or olefinic. There are preferably from 1 to 20 carbon atoms, and more preferably from 2 to 8 carbon atoms per R group. R may also be aralkyl such as

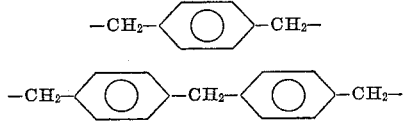

or noninterfering substituted derivatives thereof. R may also be a compatible mixture of any of aryl, alkyl, and aralkyl. R is preferably aryl, aralkyl or a noninterfering substituted derivative thereof, and the most preferred organic diisocyanate is 2,4-tolylene diisocyante. Other examples of organic diisocyanates useful for this invention are: alkyl diisocyanates such as methylene diisocyanate, ethylene diisocyanate, trimethylene diisocyanate, 1,2-diisocyanatopropane, tetramethylene diisocyanate, 2-methyl-1,2-diisocyanatopropane, pentamethylene diisocyanate, 2-methyl-1,2-diisocyanatobutane, isoamylene diisocyanate, 1,3 - diisocyanatocyclopentane, hexamethylene diisocyanate,, octamethylene diisocyanate, dodecamethylene diisocyanate, and the like, or compatible mixtures thereof; and aromatic diisocyanates including aryl and aralkyl diisocyanates exemplified by m-phenylene diisocyanate, p-phenylene diisocyanate, 2,4-tolylene diisocyanate, 2,6-tolylene diisocyanate, p-xylene diisocyanate, m-xylylene diisocyanate, 2,4-diisocyanatoanisole, 2,6 - diisocyanatoanisole, 6-nitro-m-phenylene diisocyanate, and the like, or compatible mixtures thereof.

Preferably there are from about 0.1 to about 2.0, and more preferably from about 0.8–1.2 moles of metal cyanate per mole of organic diisocyanate in the reaction mixture.

(2) Catalyst

This reaction proceeds well without the use of a catalyst, but suitable catalysts can be employed if desired in specific instances.

(3) Reaction media

As pointed out, the reaction between the metal cyanate and organic diisocyanate to form the polyisocyanate salts containing isocyanurate metal salt groups, compound A above, is carried out preferably in the presence of an aprotic solvent. The aprotic solvents having utility in this connection are characterized in that (1) they are liquid under the conditions of the reaction; (2) they have a high dielectric constant, i.e. greater than about 15 at 25° C.; (3) they preferably are dipolar, that is one part of the molecule has a more positive electrical charge relative to the other parts of the molecule, thereby causing the molecule to act as a dipole; (4) they are sufficiently inert not to enter into deleterious side reactions to any appreciable extent under the conditions of the reaction; (5) they do not possess hydrogen atoms capable of hydrogen bonding with or transferring to anions in solution in the reaction mixture.

It has been found that solvents such as benzene and acetone, although not preferred, are operative for the purposes of this invention.

Examples of solvents most useful in carrying out this process are alkyl pyrrolidones such as N-methyl-pyrrolidone-2 and N-ethyl-pyrrolidone-2; sulfoxides exemplified by dimethylsulfoxide, and diethylsulfoxide; alkyl amides including N,N-dimethyl formamide, N,N-diethyl formamide, N,N-dimethyl acetamide and N,N-diethyl acetamide; alkyl phosphoramides and aryl phosphoramides such as hexamethyl phosphoramide, hexaethyl phosphoramide, and hexaphenyl phosphoramide; nitriles—examples of which are acetonitrile and benzonitrile; alkyl ureas such as tetramethylurea and tetraethylurea; and the like; and compatible mixtures thereof. The most preferred dipolar aprotic solvent is N,N-dimethyl formamide (DMF).

The quantity of dipolar aprotic solvent used is generally in the range of from about 0.1 to about 10, and more preferably from about 0.5 to about 2.0 liters of aprotic solvent per mole of diisocyanate. Generally the amount of solvent used is variable, and will depend primarily upon work up of the desired end product.

(4) Temperature

Preferably the reaction is carried out at a temperature in the range of from 0° to about 250° C., and more preferably 5° to about 100° C., and most preferably 10° to about 75° C. The temperature in general will depend on how exothermic or endothermic the reaction is, which also is directly related to the reactivity of the reactants used. Thus, a higher temperature range will generally be required for aliphatic diisocyanates. More reactive diisocyanates, such as the preferred 2,4-tolylene diisocyanate are effectively run at room temperature, with an increase in temperature ensuing during the course of the reaction due to the exothermic nature of the reaction. In general, the optimum temperature will vary with the starting materials employed.

(5) Pressure

When using the preferred starting materials, reaction media, and temperatures, the reaction will be self-sustaining and abnormal pressure conditions will not be needed. Thus the pressure is not narrowly critical to this invention, and pressures in the range of less than 1 atmosphere up to 100 atmospheres are within the scope of this invention. High temperature and pressure limitations may be necessary for extremely unreactive starting materials.

(6) Time

Time will be a function of the reactivity of the diisocyanate and the metal cyanate. In general, the reaction time will be in the range of from 0.01 to 100 hours, and more preferably in the range of from 0.3 to 24 hours.

(7) Batch or continuous basis

Although the examples of this invention describe the process on a batch basis, it may, of course, be practiced on a continuous basis with continuous flows of starting materials through the reactor.

(8) Examples

In a preferred embodiment of this invention, and the example to follow, the values of $m$ and $n$, and hence the structure of compound A above are determined as follows: the number of unreacted isocyanate groups is determined by infrared spectrum analysis, thus giving the value of $n$; a determination of the neutral equivalent by titration of the alcohol or amine blocked isocyanurate salt is then required to obtain the value of $m$. With the values of $n$ and $m$ thus obtained, the average structure of the product polyisocyanate salt containing an isocyanurate metal salt functional group, is thus known. The structure of compound B is similarly determined. The word "average" is used because some of the product mixture will take on slightly different values of $m$, so, for example, the product in the following example may contain minor amounts of product structures wherein $m$ is 0 and/or $m$ is 2. Separation of the product mixture is not necessary for utilizing the product, for example, as ion exchange resins, free polymers for the preparation of water soluble uralkyds, and as a starting material for the preparation of novel polyurethanes.

Example I.—A 500 ml. four necked glass reactor equipped with a motor driven stirrer, reflux condenser, thermometer and dropping funnel is charged with 10.5 g. sodium cyanate (0.16 mole) and 250 ml. of anhydrous dimethylformamide (DMF). To the rapidly stirring suspension is added a solution of 40.2 g. of 2,4-tolylene diisocyanate (0.23 mole) in 50 ml. of DMF over a period of 40 minutes at 25° C. The complete operation is conducted under a nitrogen atmosphere. Owing to the heat of reaction, the temperature rises to 40° C. during the addition. After stirring for an additional hour, the reaction mixture is filtered to remove unreacted sodium cyanate (2.32 g.). The filtrate is vacuum stripped to yield 48.9 g. of a near white solid. Gas chromatographic analysis shows the product to contain 19.3% DMF; the corrected product yield is 47.6 g. Owing to the reactivity of the isocyanate (NCO) group and the presence of a metal, the product is analyzed through a manageable derivative. Thus, the solid product is redissolved in DMF and refluxed with an excess of methanol (to convert all NCO groups to the corresponding

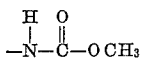

group). The urethane derivative (isolated from the above mixture as a solid is in turn dissolved in water and acidified with aq. HCl to convert the salt to the acid which separates from the aqueous solution. A quantitative N.M.R. analysis shows the product to be derived from a polyisocyanate mixture of the following average composition:

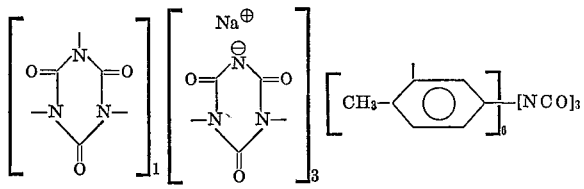

Example II.—A reaction flask is charged with 25.2 g. (0.15 mole) hexamethylene diisocyanate, 4.88 g. (0.075 mole) sodium cyanate, and 150 ml. DMF. The mixture is held at 75° C. for 24 hours ($N_2$ atmosphere). The cooled reaction mixture is filtered to recover 2.25 g. unreacted sodium cyanate. The DMF is distilled from the filtrate (in vacuo) leaving a tacky residue, 29.4 g. Quantitative IR analysis shows a free isocyanate value of 3.72 meq./g. for this product.

Gas chromatographic analyses with an internal standard show 8.4 wt. percent hexamethylene diisocyanate and 7.0 wt. percent DMF in the product. The product yield corrected for residual DMF is 27.34 g. The free isocyanate content corrected for residual DMF is 4.00 meq./g.

On the basis of the above analyses, the resin product is characterized as consisting of approximately:

1  0.137 mole   $OCN-(CH_2)_6-NCO$ 2  0.0404 mole  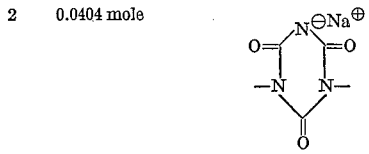

3  0.0366 mole  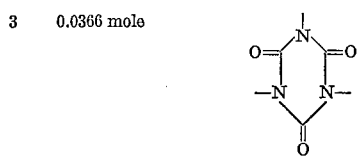

4  0.0821 mole  free NCO excluding the hexamethylene diisocyanate

The latter three functional groups are interconnected by the appropriate number of hexamethylene groups.

(9) Modifications of the invention

It should be understood that the invention is capable of a variety of modifications and variations which will be made apparent to those skilled in the art by a reading of this specification and which are to be included within the sphere of the claims appended hereto.

What is claimed is:

1. A process for the preparation of isocyanurate-containing polyisocyanate salts comprising reacting organic diisocyanate with from about 0.1 to about 2.0 moles of metal cyanate per mole of organic diisocyanate in the presence of from about 0.1 to ten liters of aprotic solvent per mole of organic diisocyanate at a temperature of from about 0° to about 250° C. to form salts of the metal of said metal cyanate.

2. The process of claim 1 wherein the metal cyanate is an alkali metal cyanate.

3. The process of claim 1 wherein the metal cyanate is an alkaline earth metal cyanate.

4. The process of claim 1 wherein the metal cyanate is sodium cyanate.

5. The process of claim 1 wherein the aprotic solvent is a dipolar aprotic solvent.

6. The process of claim 4 wherein the dipolar aprotic solvent is dimethyl formamide.

7. The process of claim 1 wherein the organic diisocyanate has the structural formula: OCN—R—NCO wherein R is selected from the group consisting of aryl, alkyl, aralkyl, their hydrocarbon-, nitro-, cyano-, halo-, and aryloxy derivatives containing from about 1 to about 20 carbon atoms.

8. The process of claim 1 wherein the organic diisocyanate is 2,4-tolylene diisocyanate.

9. The process of claim 1 wherein the reaction time is from about 0.01 to about 100 hours.

10. A process for the preparation of isocyanurate-containing polyisocyanate salts comprising reacting organic diisocyanate with from about 0.1 to about 2.0 moles of metal cyanate selected from the group consisting of alkali metal cyanate, alkaline earth metal cyanate and compatible mixtures thereof per mole of organic diisocyanate selected from the group consisting of aryl, alkyl, and aralkyl diisocyanates and compatible mixtures thereof in the presence of from about 0.5 to about 2.0 liters of dipolar aprotic solvent per mole of diisocyanate at a temperature of from about 0° to about 250° C. and from about 0.01 to about 100 hours to form salts of said metals.

11. The process of claim 9 wherein the metal cyanate is sodium cyanate.

12. The process of claim 9 wherein the mole ratio of metal cyanate to organic diisocyanate is 1 to 1.

13. An isocyanurate-containing monovalent metal salt having the structural formula

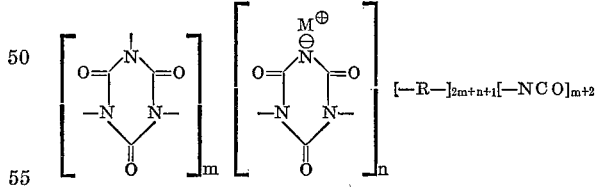

wherein $n$ is a positive integer and $m$ is zero or a positive integer, and R is selected from the group consisting of aryl, alkyl, aralkyl, their hydrocarbons-, nitro-, cyano-, halo-, aryloxy derivatives and mixtures thereof containing from about 1 to about 20 carbon atoms, and M is a monovalent metal and there are no N-to-N bonds.

14. An isocyanurate-containing polyisocyanate metal salt having the structural formula:

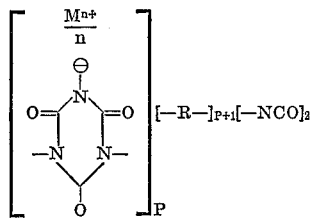

wherein $n$ is the oxidation number of the metal and $p$ is a positive integer greater than 1 and R is selected from the group consisting of aryl, alkyl, aralkyl, their hydrocarbons-, nitro-, cyano-, halo-, aryloxy derivatives and mixtures thereof containing from about 1 to about 20 carbon atoms, and M is a polyvalent metal and there are no N-to-N bonds.

References Cited
UNITED STATES PATENTS

| | | | |
|---|---|---|---|
| 2,536,849 | 1/1951 | Kaiser et al. | 260—248 |
| 2,866,801 | 12/1958 | Himel et al. | 260—453 |
| 2,866,802 | 12/1958 | Graham | 260—453 |
| 2,993,870 | 7/1961 | Burkus | 260—2.5 |
| 3,108,100 | 10/1963 | Tate et al. | 260—248 |
| 3,211,704 | 10/1965 | Gilman et al. | 260—77.5 |
| 3,249,607 | 5/1966 | Taub et al. | 260—248 |
| 3,259,626 | 7/1966 | Mueller et al. | 260—248 |
| 3,458,448 | 7/1969 | Argabright et al. | 252—182 |

DONALD E. CZAJA, Primary Examiner

H. S. COCKERAM, Assistant Examiner

U.S. Cl. X.R.

260—21, 22, 248, 453